E. T. MATHEWSON.
BUMPER.
APPLICATION FILED JAN. 11, 1921.
1,397,224.
Patented Nov. 15, 1921.
2 SHEETS—SHEET 1.
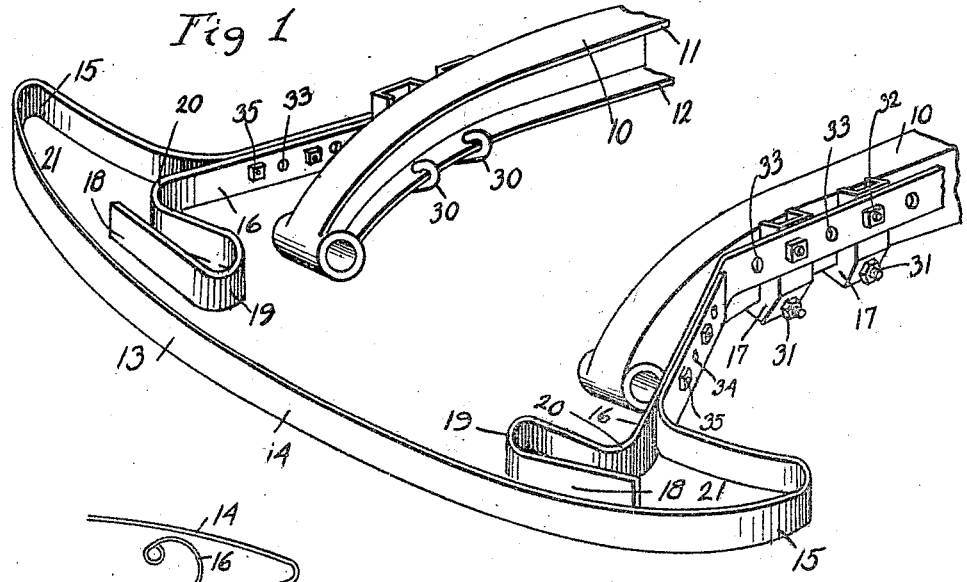
ERNEST T. MATHEWSON
INVENTOR
BY
Clarence S. Walker
ATTORNEY

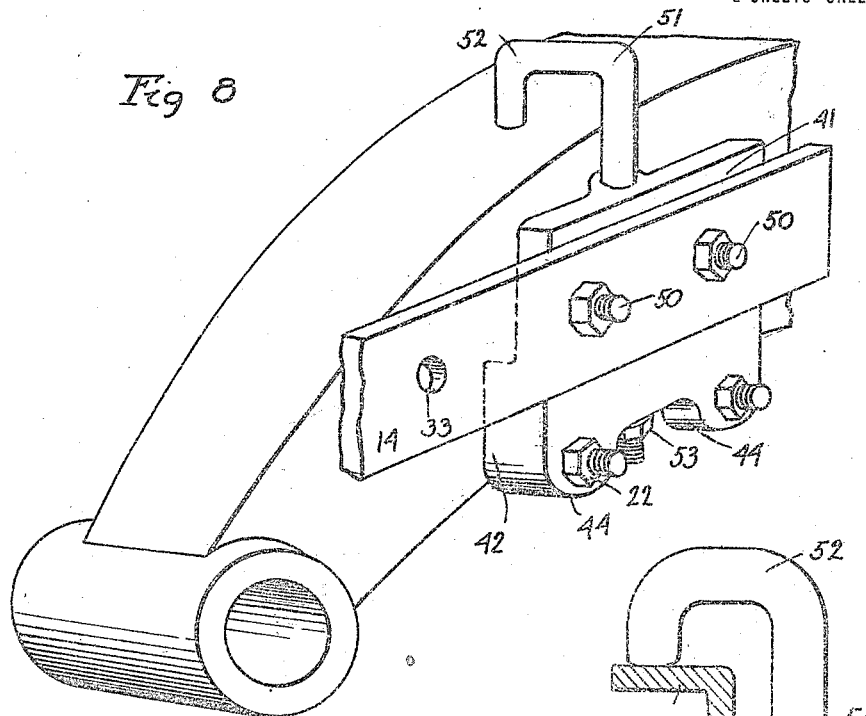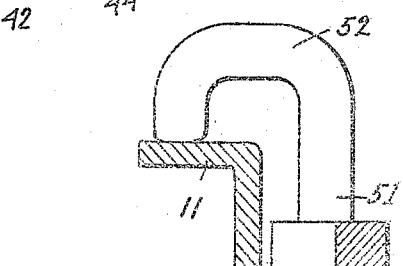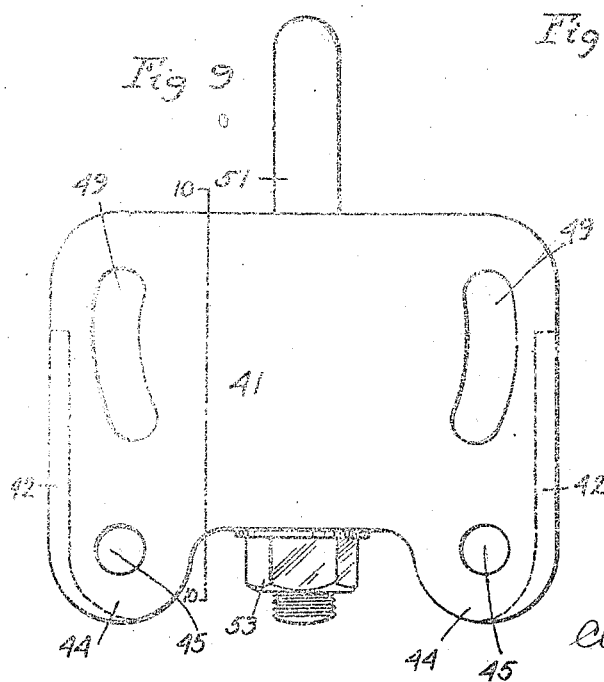

UNITED STATES PATENT OFFICE.

ERNEST T. MATHEWSON, OF BUFFALO, NEW YORK.

BUMPER.

1,397,224.

Specification of Letters Patent. Patented Nov. 15, 1921.

Application filed January 11, 1921. Serial No. 436,539.

*To all whom it may concern:*

Be it known that I, ERNEST T. MATHEWSON, a citizen of the United States, and a resident of Buffalo, Erie county, State of New York, have invented certain new and useful Improvements in Bumpers, of which the following is a specification.

This invention relates to an improvement in bumpers for vehicles and particularly to spring bumpers adapted for use on automobiles and to means for attaching such bumpers thereon.

One object of this invention is to provide a bumper comprising a single continuous spring bar having its ends bent reversely and inwardly.

Another object is to provide a bumper having cumulative resistance functions so that it will absorb both light and heavy shocks.

A further object is to provide a bumper having separate shock absorbing means, one to resist light shocks and the other to resist heavy shocks.

A still further object is to provide a bumper having means to resist light shocks and also means to reinforce said first named means so that both means will coöperate to resist heavy shocks.

A still further object is to provide means by which the bumper can be attached to any automobile quickly and without previous preparation of the part of the automobile to which it is attached.

Another object is to provide a plurality of equally spaced holes in the parts of the bumper so that they can be assembled in any desired adjustment.

Further objects of the invention will appear from a consideration of the specification and the drawings which form a part thereof and in which—

Figure 1 represents one embodiment of this invention attached to an automobile;

Figs. 2 to 5 represent diagrammatically other embodiments of this invention.

Fig. 6 represents a cross section of one form of bumper attaching brackets mounted on an automobile;

Fig. 7 represents a side view of the bracket taken on the line 7—7 of Fig. 6.

Fig. 8 discloses another form of bumper attaching brackets.

Fig. 9 is a view of the attaching bracket on a larger scale than Fig. 8 and

Fig. 10 is a section taken along the line 10—10 of Fig. 9.

Referring to the drawings the reference numeral 10 designates the side bars of an automobile to which the bumper is attached. These side bars are customarily of channeled metal having inwardly projecting upper and lower flanges 11 and 12. Only one end or horn of the side bars to which the springs are secured is shown.

The bumper 13 comprises a continuous spring bar 14 having its ends 15 bent reversely and inwardly, and two supports 16 on which the bar 14 is mounted. Each of the supports 16 is fastened to a side bar 10 by brackets 17 and extends outwardly beyond the juncture of the bar 14. The ends of the supports as shown in Fig. 1 have a part 18 parallel to the bar 14 and two bends 19 and 20. The parts 18 are within the horns 21 of the bar 14 formed by the bent ends 15 and hence when the spring bar 14 is bent inward under a blow the ends of the supports will take up the shock. In other words the ends of the supports being normally out of contact, the bar 14 alone will resist light shocks but under a heavy shock the bar is forced back against the parts 18 of the supports which will then coöperate with it.

The supports 16 instead of having the shaped ends shown in Fig. 1 may have the curved contour shown in Figs. 2 and 5 or the straight line contour shown in Figs. 3 and 4. The ends of the bar 14 are secured to the supports 16 behind the curved outer ends and the portions of the support inwardly from the point of connection are straight so that all portions of the bumper which yield under a direct blow are beyond the point of connection. The bends 19 of the supports 16 are shown substantially in line with the inner side of the horns 10 so that the spare tire can be mounted between them when the bumper is on the rear of the car. It will be noted that the supports coöperate with the bar 14 in each case and it is obvious that the invention is by no means limited to the constructions here illustrated.

The bumper supports are firmly attached to the side bars 10 by means of suitable brackets. Two forms are here disclosed. In that shown in Figs. 1, 6 and 7, which is the preferred form, two separate brackets are employed for each support.

These brackets 17 are quickly and rigidly attached to the ends of the side bars 10 in any desired position without the necessity of any prior preparation of the bars. The brackets 17 each comprise a face portion 22 having two parallel flanges 23. Each flange 23 has an edge 24 parallel to the face portion 22, an edge 25 at right angles to edge 24 and an inclined edge 26 connecting edge 25 with the face portion 22. That portion is slightly bent at 27, and has longitudinally extending slots 28 and 29.

In mounting the bracket the edges 24 are placed against the side of the bar 10 with the edges 25 against the bottom flange 12. A hooked rod 30 passed through the slot 28 is hooked over the inner edge of the flange 12 and the bracket is clamped in place by a nut 31 threaded onto the rod outside the face portion 22.

The supports 16 are secured to the brackets by bolts 32 passed through the slots 29 and holes 33 in the supports. A plurality of these holes 33 equally spaced are provided in the supports 16, and similarly spaced holes 34 are provided in the ends of the bar 14, the latter being fastened to the supports by bolts 35 through the holes 33 and 34. This arrangement permits the easy adjustment of the space between the primary bump receiving means 14 and the secondary bump receiving means 16, and also furnishes another way to regulate the distance the bumper projects from the vehicle. An up or down adjustment is permitted by the form of the slots 29.

The second form of attaching bracket referred to above is shown in Figs. 8, 9 and 10 and comprises, in contradistinction to the first form, a unitary plate carrying two bolts by which the support 16 is rigidly held. This type of bracket, like the first, requires no prior preparation of the side bars and is clamped to the side bars at three triangulated points, any two of which will resist a blow from any direction.

The bracket 40 has a body plate 41 plane on the outer side to which the bumper support 16 is secured. Projecting inwardly at each end of the plate are flanges 42 and at the center is a vertical boss 43. At the bottom of the plate are ears 44 having holes 45 through which fastening rods 46 pass. The rods 46 are hooked at their inner ends 47 for a purpose to be described later and are threaded at their outer ends for the nuts 48. Curved slots 49 are provided in the body plate 41 for the bumper holding bolts 50. Through the boss 43 extends a rod 51 the upper end 52 of which is bent at right angles and then bent downwardly at right angles as shown in Fig. 10. At the lower end of the rod is a threaded nut 53.

In attaching the bumper to the vehicle the support 16 is first fastened by the bolts 50 to the plate 41. Since the bolts are in the curved slots 49 the angles and the resultant height of the bumper can be fixed as desired. The bracket is now fastened to the horn 10 by hooking the ends of the rods 46 over the flanges 12 and tightening the nuts 48. Finally in order to prevent slipping of the bracket on the horn under a blow to the bumper the end 52 of the rod 51 is clamped against the upper side of the flange 11 by the nut 53.

Since the rods 46 and 51 are adjustable they will adapt themselves to side frame bars of varying sizes thus eliminating the necessity of providing a different bracket for each size. Furthermore the distance of the bumper ahead of the vehicle can be regulated by fastening the bracket at any point along the side bar 10 in spite of the fact that the height and width of the bar increases.

The drawings show a form of vehicle in which the side bars extend beyond the fenders so that there will be no difficulty in mounting the brackets on the horns. Should, however, the side bars not extend beyond the fenders either form of bracket could be used. The first form fits entirely below the upper edge of the horn and will thus be below the fender. The second form, however, by reason of the rod 51 requires that a hole be made through the fender so it can be clamped against the upper side of the upper flange.

While several embodiments have been shown and described it will be understood that the invention is by no means limited thereby and that others may be made within the spirit and scope of the invention as set forth in the following claims.

Having thus disclosed my invention what I claim as new and for which I desire the protection of Letters Patent is;

1. A bumper for vehicles having primary bump receiving means and supporting means, said first named means comprising a spring bar extending transversely of the vehicle and having ends bent reversely and inwardly toward the vehicle toward and joined to said supporting means, the ends of said supporting means extending outwardly beyond the points of joinder toward the front portion of said spring bar to form secondary bump receiving means.

2. A bumper for vehicles comprising a bump receiving spring bar extending transversely of the vehicle and having its ends bent reversely and inwardly toward said vehicle, supporting plates mounted on said vehicle and extending toward the spring bar, and means fastening the ends of said spring bar to said supporting means, the ends of said supporting means being normally out of contact with said bar.

3. A bumper for vehicles having primary bump receiving means and supporting means, said first named means comprising a spring bar extending transversely of the vehicle, the ends of said bar being bent reversely and inwardly toward the vehicle, said second named means being mounted on said vehicle and extending toward the spring bar, the portion of each supporting means adjacent the vehicle being straight, and means fastening the ends of the spring bar to said straight portions.

4. A bumper for vehicles having primary bump receiving means and secondary bump receiving means, said first named means comprising a spring bar extending transversely of the vehicle and having its ends bent reversely and inwardly, and said secondary means comprising two plates mounted on said vehicle and curved at the outer ends to form bump receiving portions substantially parallel to and in the rear of said spring bar, and means joining said first means to said plates at points behind said curved portions.

5. A bumper for vehicles comprising a spring bar, supports to which said bar is connected, said supports being fastened to the side bars of the vehicle, each end of said bar and said supports being provided with a longitudinally extending series of equally spaced holes and bolts passed through certain of said holes in said bar and said supports for joining said parts and through other of said holes in said supports for fastening said supports to the vehicle side bars.

6. In a bumper adapted to be mounted on the side bars of vehicles, a spring bar, supporting plates to which the ends of said bar are connected, each of said plates being provided with a row of equally spaced holes, and each end of said bar being provided with a similar row of holes, said ends being located against the plates so that any desired sets of holes will coincide, bolts through certain of the coinciding holes for positively securing the parts in such position, and means for fixing said plates to the side bars.

7. In a bumper adapted to be mounted on the side bars of vehicles, a spring bar, supporting plates to which the ends of said bar are connected, each of said plates being provided with a row of equally spaced holes, and each end of said bar being provided with a similar row of holes, said ends being located against the plates so that any desired sets of holes will coincide, bolts through certain of the coinciding holes for positively securing the parts in such position, and means including bolts through certain of said holes in said supporting plates for fixing them to the side bars.

8. In a bumper adapted to be mounted upon the side bars of a vehicle, a spring bar, supporting plates to which the ends of said bar are connected, said plates projecting beyond the side bars of the vehicle, brackets fixed to said side bars, each bracket having two horizontally spaced bolts projecting from the outer face, and each of said supporting plates having a row of holes spaced the same distance apart as the bolts on said brackets, through certain of which holes the bolts project when the plates and brackets are assembled, whereby the amount of projection of said plates can be varied by the selection of the sets of holes through which said bolts shall project, and means for fixing said plates to said brackets.

9. Means for attaching a bumper to the channeled side bar of an automobile comprising a flanged bracket, a rod passing through the bracket and hooked over the lower flange of the channeled side bar and a second rod bearing against the upper side of the upper flange of the side bar.

10. Means for attaching a bumper to the channeled side bar of an automobile comprising a bracket having a face portion provided with apertures, a hooked rod passing through one of said apertures to clamp the bracket to the lower flange of the side bar, a bolt through another of said apertures clamping the bumper to the bracket and a second rod bearing against the upper side of the upper flange of the side bar.

11. Means for attaching a bumper to the channeled side bar of a vehicle said means being provided with two parallel projections lying transversely of the outer face of said bar and a clamping rod for engaging one of the flanges of said side bar at a point intermediate the lines of contact of said projections.

12. Bumper attaching means consisting of a body plate, plane on one side, having inwardly projecting flanges at each end and a vertical boss at the center, rods projecting at right angles to said plate through openings therein, and a rod passing through said boss, said rods being adapted to clamp said means to the side bar of a vehicle.

13. The combination with a channeled side bar of a vehicle, of a bumper attaching bracket, rods in said bracket hooked over the lower flange of said side bar and a rod in said bracket positively clamped against the upper flange of said side bar.

In testimony whereof I affix my signature.

ERNEST T. MATHEWSON.